United States Patent
Guo

(10) Patent No.: US 11,455,596 B1
(45) Date of Patent: Sep. 27, 2022

(54) SYSTEMS AND METHODS FOR WAREHOUSE STORAGE RACK SAFETY

(71) Applicant: Xiaoyu Guo, Auckland (NZ)

(72) Inventor: Xiaoyu Guo, Auckland (NZ)

( * ) Notice: Subject to any disclaimer, the term of this patent is extended or adjusted under 35 U.S.C. 154(b) by 0 days.

(21) Appl. No.: 17/471,647

(22) Filed: Sep. 10, 2021

(51) Int. Cl.
| | |
|---|---|
| *G06Q 10/00* | (2012.01) |
| *G06Q 10/08* | (2012.01) |
| *H04W 4/38* | (2018.01) |
| *G06Q 50/28* | (2012.01) |
| *H04W 4/70* | (2018.01) |
| *G08B 21/18* | (2006.01) |
| *H04W 4/35* | (2018.01) |

(52) U.S. Cl.
CPC ........... *G06Q 10/087* (2013.01); *G06Q 50/28* (2013.01); *G08B 21/182* (2013.01); *H04W 4/35* (2018.02); *H04W 4/38* (2018.02); *H04W 4/70* (2018.02)

(58) Field of Classification Search
CPC .... G06Q 10/087; G06Q 50/28; G08B 21/182; H04W 4/35; H04W 4/38; H04W 4/70
USPC .......................................................... 705/28
See application file for complete search history.

(56) References Cited

U.S. PATENT DOCUMENTS

| | | | | |
|---|---|---|---|---|
| 10,064,502 | B1 * | 9/2018 | Gyori | ...................... H04W 4/80 |
| 11,002,589 | B1 * | 5/2021 | Zhang | ..................... G01G 19/14 |
| 2010/0156597 | A1 * | 6/2010 | Stern | .................... G06Q 10/087 |
| | | | | 340/5.92 |

FOREIGN PATENT DOCUMENTS

| | | | | | |
|---|---|---|---|---|---|
| CN | 110490515 | A | * | 11/2019 | |
| CN | 111805506 | A | * | 10/2020 | .............. B25J 19/02 |
| DE | 102010024932 | A1 | * | 12/2011 | .......... G01M 5/0041 |
| DE | 102010024932 | A1 | | 12/2011 | |
| DE | 102019216792 | A1 | | 5/2021 | |
| EP | 3736230 | A1 | * | 11/2020 | |
| EP | 3736230 | A1 | | 11/2020 | |
| GB | 2542193 | A | | 3/2017 | |

OTHER PUBLICATIONS

International Search Report issued by the Australian Patent Office in connection with International Application No. PCT/NZ2021/050165, dated Nov. 22, 2021.
Written Opinion of the International Seach Report issued by the Australian Patent Office in connection with International Application No. PCT/NZ2021/050165, dated Nov. 22, 2021.

* cited by examiner

*Primary Examiner* — Russell S Glass

(74) *Attorney, Agent, or Firm* — Carter, DeLuca & Farrell LLP; George Likourezos

(57) ABSTRACT

A warehouse storage rack safety system includes a sensor configured to couple to a shelf and generate a signal indicative of a deformation of the shelf, a processor, and a memory, including instructions stored thereon, which when executed by the processor cause the warehouse storage rack safety system to receive the sensed signal and determine an amount of deformation of the shelf based on the signal.

18 Claims, 3 Drawing Sheets

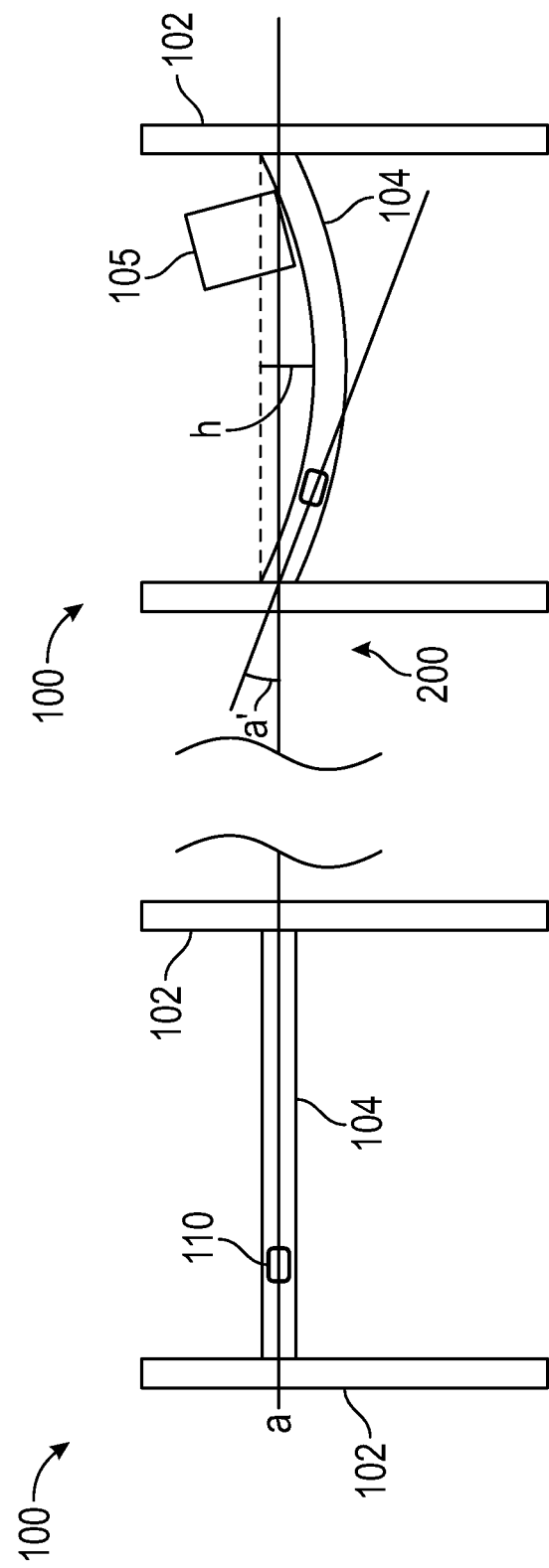

SYSTEMS AND METHODS FOR WAREHOUSE STORAGE RACK SAFETY

TECHNICAL FIELD

This disclosure relates to safety systems and, more particularly, to structures and methods for effectuating warehouse storage rack safety systems.

BACKGROUND

Typically warehouse storage racks are loaded with goods. These goods may exceed the safety rating for a particular shelf. Systems and methods are needed for effectuating warehouse storage rack safety.

SUMMARY

According to one aspect, a warehouse storage rack safety system includes a sensor configured to couple to a shelf and generate a signal indicative of a deformation of the shelf, a processor, and a memory, including instructions stored thereon, which when executed by the processor cause the warehouse storage rack safety system to receive the sensed signal and determine an amount of deformation of the shelf based on the signal.

In an aspect of the present disclosure, the instructions, when executed by the processor, may further cause the warehouse storage rack safety to display on a display the determined amount of deformation.

In another aspect of the present disclosure, the instructions, when executed by the processor, may further cause the warehouse storage rack safety system to determine if an object placed on the shelf is overweight by comparing the determined amount of deformation to a predetermined threshold value.

In yet another aspect of the present disclosure, the instructions, when executed by the processor, may further cause the warehouse storage rack safety system to generate an audio alert and/or a visual alert that the object is overweight based on exceeding the predetermined threshold value.

In an aspect of the present disclosure, the instructions, when executed by the processor, may further cause the warehouse storage rack safety system to wirelessly transmit an alert based on the object being overweight to a user device.

In another aspect of the present disclosure, the instructions, when executed by the processor, may further cause the warehouse storage rack safety system to display on the user device the transmitted alert.

In yet another aspect of the present disclosure, the instructions, when executed by the processor, may further cause the warehouse storage rack safety system to wirelessly transmit an alert based on the object being overweight to the Cloud.

In an aspect of the present disclosure, the sensor may include a gyroscope and/or an accelerometer.

In an aspect of the present disclosure, when determining the amount of deformation, the instructions, when executed by the processor, may further cause the warehouse storage rack safety system to determine a change in angle of the warehouse rack safety system relative to a state where the object is not placed on the shelf based on the sensed signal.

In another aspect of the present disclosure, the system may further include a battery configured to power the warehouse storage rack safety system and a low battery monitor configured to generate an alert when the battery has an operating voltage below a second threshold value.

In accordance with aspects of the disclosure, a computer-implemented method for a warehouse storage rack safety system, the computer-implemented method includes receiving a signal from a sensor configured to couple to a shelf and generate the signal indicative of a deformation of the shelf and determining an amount of deformation of the shelf based on the signal.

In an aspect of the present disclosure, the method may further include displaying on a display the determined amount of deformation.

In another aspect of the present disclosure, the method may further include determining if an object placed on the shelf is overweight by comparing the determined amount of deformation to a predetermined threshold value.

In yet another aspect of the present disclosure, the method may further include generating an audio alert and/or a visual alert that the object is overweight based on exceeding the predetermined threshold value.

In yet a further aspect of the present disclosure, the method may further include wirelessly transmitting an alert based on the object being overweight to a user device.

In another aspect of the present disclosure, the method may further include displaying on the user device the transmitted alert.

In yet another aspect of the present disclosure, the method may further include wirelessly transmitting an alert based on the object being overweight to the Cloud.

In another aspect of the present disclosure, the sensor may include a gyroscope and/or an accelerometer.

In yet another aspect of the present disclosure, the method may further include determining a change in angle of the warehouse rack safety system relative to a state where the object is not placed on the shelf based on the sensed signal.

In accordance with aspects of the disclosure, a non-transitory computer-readable medium storing instructions that, when executed by a processor, cause the processor to perform a method for a warehouse storage rack safety system is presented. The method includes receiving a signal from a sensor configured to couple to a shelf and generate the signal indicative of a deformation of the shelf and determining an amount of deformation of the shelf based on the signal.

Other aspects, features, and advantages will be apparent from the description, the drawings, and the claims that follow.

BRIEF DESCRIPTION OF DRAWINGS

The accompanying drawings, which are incorporated in and constitute a part of this specification, illustrate aspects of the disclosure and, together with a general description of the disclosure given above and the detailed description given below, explain the principles of this disclosure, wherein:

FIG. 1 is a diagram illustrating a warehouse storage rack safety system mounted to a storage rack in accordance with this disclosure;

FIG. 2 is a diagram illustrating a loaded storage shelf being monitored by the warehouse storage rack safety system of FIG. 1 in accordance with this disclosure;

DETAILED DESCRIPTION

Figure 3:
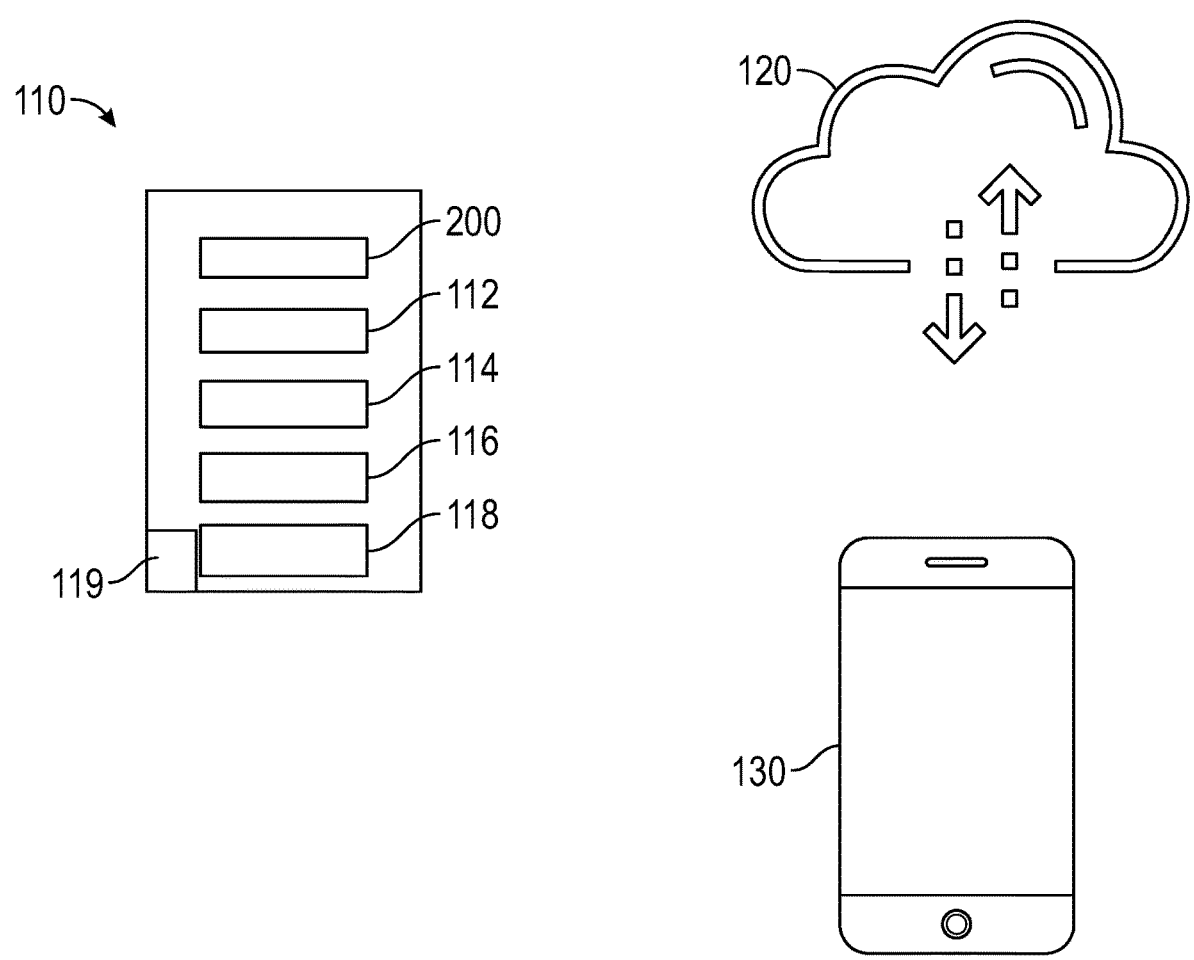
FIG. 3 is a block diagram of the warehouse storage rack safety system of FIG. 1.

Aspects of the disclosed warehouse storage rack safety systems and methods are described in detail with reference to the drawings, in which like reference numerals designate identical or corresponding elements in each of the several views. Directional terms such as top, bottom, and the like are used simply for convenience of description and are not intended to limit the disclosure attached hereto.

In the following description, well-known functions or constructions are not described in detail to avoid obscuring the present disclosure in unnecessary detail.

FIGS. 1-3 illustrate a warehouse storage rack safety system 110. The warehouse storage rack safety system 110 is configured to be mounted by any suitable means to a warehouse storage shelf 104. The warehouse storage rack safety system 110 may be mounted to any suitable surface of the storage shelf 104. The warehouse storage rack safety system 110 generally includes a sensor 112 configured to sense a deformation "h" (FIG. 2) of a storage shelf 104 when one or more objects 105 are placed on the storage shelf 104, a controller 200, a signal transmitter 114, a battery 118 configured to power the warehouse storage rack safety system 110, a low battery monitor 116, and a display 119 configured to display data, settings, and/or warnings.

The sensor 112 may be a gyroscope and/or an accelerometer (e.g., a g-sensor).

Initially, the storage shelf 104 is horizontal with no object(s) on it (FIG. 1). The sensor 112 is configured to sense an initial angle "a" prior to object(s) 105 being loaded on a storage shelf 104. The sensor 112 communicates the initial angle to the controller 200. When object(s) 105 have been loaded onto the storage shelf 104, then the storage shelf 104 deforms under the weight of the object(s) 105 (FIG. 2), and the sensor 112 senses a new angle "a'." The sensor communicates the new angle "a'" to the controller 200 for further processing.

The signal transmitter 114 is configured to transmit data from the warehouse storage rack safety system 110 to either the web 120 (e.g., the Cloud) or to a user device 130 for further processing and/or display (FIG. 3).

The battery 118 is configured to power the warehouse storage rack safety system 110. It is contemplated that the warehouse storage rack safety system 110 may be powered by AC and/or DC voltage as well. The low battery monitor 116 is configured to monitor battery 118 voltage and generate an alert (audio and/or visual) when the battery voltage is below a predetermined threshold value (e.g., below about 0.9 VDC).

Figure 4:
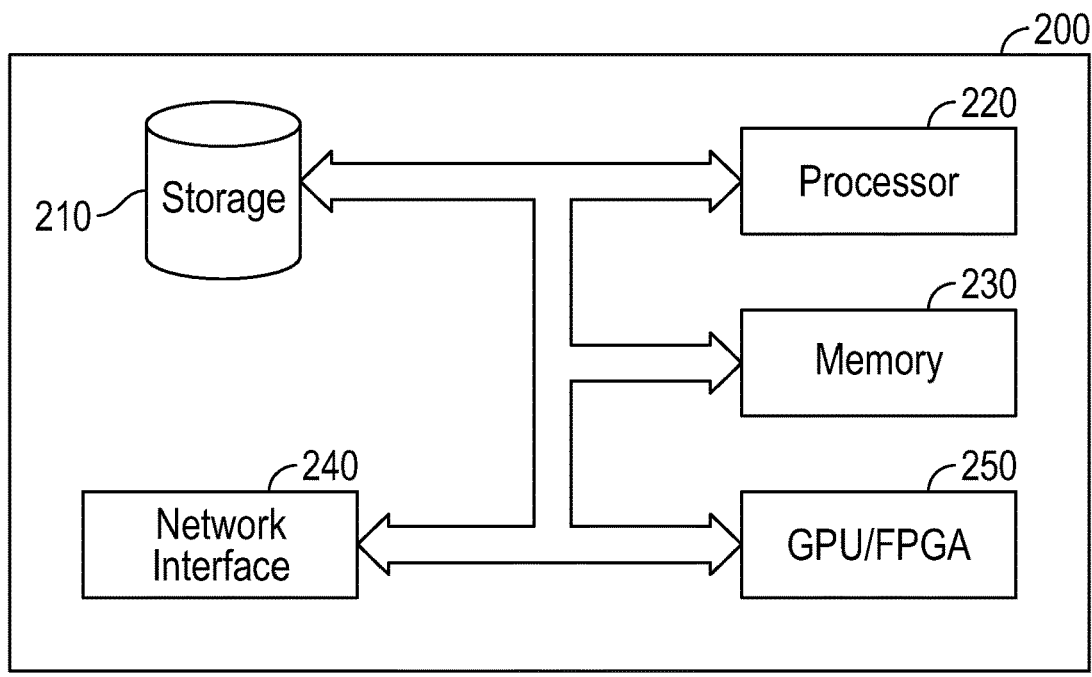
FIG. 4 is a block diagram of a controller configured for use with the predictive maintenance system of FIG. 1.

FIG. 4 illustrates that controller 200 includes a processor 220 connected to a computer-readable storage medium or a memory 230. The computer-readable storage medium or memory 230 may be a volatile type of memory, e.g., RAM, or a non-volatile type of memory, e.g., flash media, disk media, etc. In various aspects of the disclosure, the processor 220 may be another type of processor such as a digital signal processor, a microprocessor, an ASIC, a graphics processing unit (GPU), a field-programmable gate array (FPGA), or a central processing unit (CPU). In certain aspects of the disclosure, network inference may also be accomplished in systems that have weights implemented as memristors, chemically, or other inference calculations, as opposed to processors.

In aspects of the disclosure, the memory 230 can be random access memory, read-only memory, magnetic disk memory, solid-state memory, optical disc memory, and/or another type of memory. In some aspects of the disclosure, the memory 230 can be separate from the controller 200 and can communicate with the processor 220 through communication buses of a circuit board and/or through communication cables such as serial ATA cables or other types of cables. The memory 230 includes computer-readable instructions that are executable by the processor 220 to operate the controller 200. In other aspects of the disclosure, the controller 200 may include a network interface 240 to communicate with other computers or to a server. A storage device 210 may be used for storing data.

The disclosed method may run on the controller 200 or on a user device, including, for example, on a mobile device, an IoT device, or a server system.

Moreover, the disclosed structure can include any suitable mechanical, electrical, and/or chemical components for operating the disclosed pivot predictive maintenance system or components thereof. For instance, such electrical components can include, for example, any suitable electrical and/or electromechanical, and/or electrochemical circuitry, which may include or be coupled to one or more printed circuit boards. As used herein, the term "controller" includes "processor," "digital processing device" and like terms, and are used to indicate a microprocessor or central processing unit (CPU). The CPU is the electronic circuitry within a computer that carries out the instructions of a computer program by performing the basic arithmetic, logical, control and input/output (I/O) operations specified by the instructions, and by way of non-limiting examples, include server computers. In some aspects, the controller includes an operating system configured to perform executable instructions. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. In some aspects, the operating system is provided by cloud computing.

In some aspects, the term "controller" may be used to indicate a device that controls the transfer of data from a computer or computing device to a peripheral or separate device and vice versa, and/or a mechanical and/or electromechanical device (e.g., a lever, knob, etc.) that mechanically operates and/or actuates a peripheral or separate device.

In aspects, the controller includes a storage and/or memory device. The storage and/or memory device is one or more physical apparatus used to store data or programs on a temporary or permanent basis. In some aspects, the controller includes volatile memory and requires power to maintain stored information. In various aspects, the controller includes non-volatile memory and retains stored information when it is not powered. In some aspects, the non-volatile memory includes flash memory. In certain aspects, the non-volatile memory includes dynamic random-access memory (DRAM). In some aspects, the non-volatile memory includes ferroelectric random-access memory (FRAM). In various aspects, the non-volatile memory includes phase-change random access memory (PRAM). In certain aspects, the controller is a storage device including, by way of non-limiting examples, CD-ROMs, DVDs, flash memory devices, magnetic disk drives, magnetic tapes drives, optical disk drives, and cloud computing-based storage. In various aspects, the storage and/or memory device is a combination of devices such as those disclosed herein.

In some aspects, the controller includes a display to send visual information to a user. In various aspects, the display is a cathode ray tube (CRT). In various aspects, the display is a liquid crystal display (LCD). In certain aspects, the display is a thin film transistor liquid crystal display (TFT-LCD). In aspects, the display is an organic light emitting diode (OLED) display. In certain aspects, on OLED display is a passive-matrix OLED (PMOLED) or active-matrix OLED (AMOLED) display.

The controller may include or be coupled to a server and/or a network. As used herein, the term "server" includes "computer server," "central server," "main server," and like terms to indicate a computer or device on a network that manages the system, components thereof, and/or resources thereof. As used herein, the term "network" can include any network technology including, for instance, a cellular data network, a wired network, a fiber optic network, a satellite network, and/or an IEEE 802.11a/b/g/n/ac wireless network, among others.

In various aspects, the controller can be coupled to a mesh network. As used herein, a "mesh network" is a network topology in which each node relays data for the network. All mesh nodes cooperate in the distribution of data in the network. It can be applied to both wired and wireless networks. Wireless mesh networks can be considered a type of "Wireless ad hoc" network. Thus, wireless mesh networks are closely related to Mobile ad hoc networks (MANETs). Although MANETs are not restricted to a specific mesh network topology, Wireless ad hoc networks or MANETs can take any form of network topology. Mesh networks can relay messages using either a flooding technique or a routing technique. With routing, the message is propagated along a path by hopping from node to node until it reaches its destination. To ensure that all its paths are available, the network must allow for continuous connections and must reconfigure itself around broken paths, using self-healing algorithms such as Shortest Path Bridging. Self-healing allows a routing-based network to operate when a node breaks down or when a connection becomes unreliable. As a result, the network is typically quite reliable, as there is often more than one path between a source and a destination in the network. This concept can also apply to wired networks and to software interaction. A mesh network whose nodes are all connected to each other is a fully connected network.

In some aspects, the controller may include one or more modules. As used herein, the term "module" and like terms are used to indicate a self-contained hardware component of the central server, which in turn includes software modules. In software, a module is a part of a program. Programs are composed of one or more independently developed modules that are not combined until the program is linked. A single module can contain one or several routines, or sections of programs that perform a particular task.

As used herein, the controller includes software modules for managing various aspects and functions of the disclosed system or components thereof.

The disclosed structure may also utilize one or more controllers to receive various information and transform the received information to generate an output. The controller may include any type of computing device, computational circuit, or any type of processor or processing circuit capable of executing a series of instructions that are stored in memory. The controller may include multiple processors and/or multicore central processing units (CPUs) and may include any type of processor, such as a microprocessor, digital signal processor, microcontroller, programmable logic device (PLD), field programmable gate array (FPGA), or the like. The controller may also include a memory to store data and/or instructions that, when executed by the one or more processors, cause the one or more processors to perform one or more methods and/or algorithms.

Any of the herein described methods, programs, algorithms or codes may be converted to, or expressed in, a programming language or computer program. The terms "programming language" and "computer program," as used herein, each include any language used to specify instructions to a computer, and include (but is not limited to) the following languages and their derivatives: Assembler, Basic, Batch files, BCPL, C, C+, C++, Delphi, Fortran, Java, JavaScript, machine code, operating system command languages, Pascal, Perl, PL1, scripting languages, Visual Basic, metalanguages which themselves specify programs, and all first, second, third, fourth, fifth, or further generation computer languages. Also included are database and other data schemas and any other meta-languages. No distinction is made between languages that are interpreted, compiled, or use both compiled and interpreted approaches. No distinction is made between compiled and source versions of a program. Thus, reference to a program where the programming language could exist in more than one state (such as source, compiled, object, or linked) is a reference to any and all such states. Reference to a program may encompass the actual instructions and/or the intent of those instructions.

Figure 5:
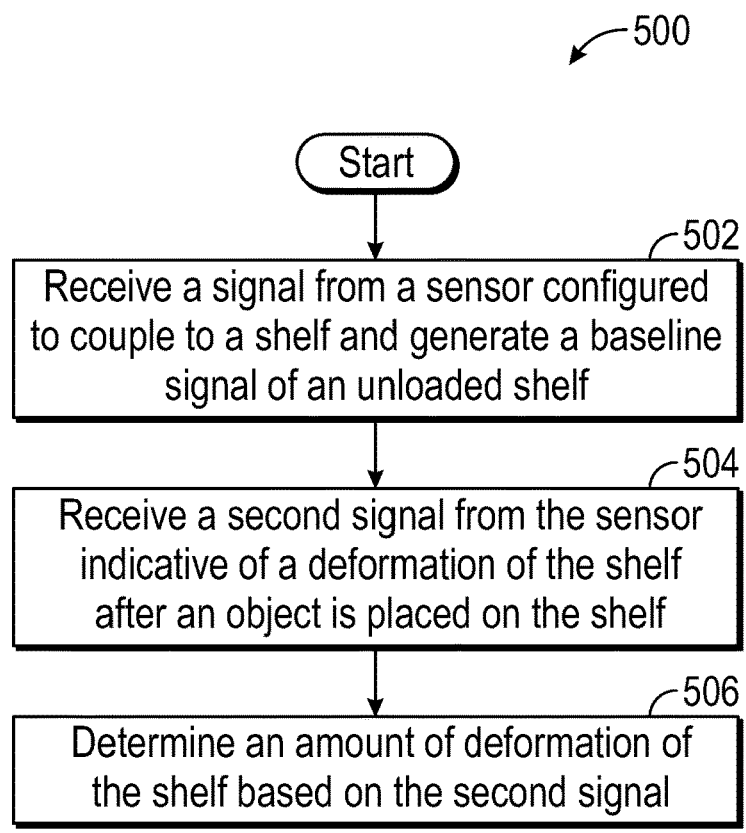
FIG. 5 is a flow diagram for a method for warehouse storage rack safety of FIG. 1 in accordance with this disclosure.

The flow diagram of FIG. 5 shows a computer-implemented method 500 warehouse storage rack safety in connection with the use of the warehouse storage rack safety system 110 of FIG. 1. Other variations are contemplated to be within the scope of the disclosure. The operations of FIG. 5 will be described with respect to a computing device, e.g., controller 200 of warehouse storage rack safety system 110 (FIG. 4), or any other suitable computing system device or location thereof, including a remotely-disposed computing device. It will be understood that the illustrated operations are applicable to other systems and components thereof as well.

Initially, at step 502, the controller 200 receives a signal from a sensor 112 coupled to an unloaded storage shelf 104. The term coupled as used in the present disclosure is defined as merely placing the sensor 112 on the storage shelf 104 and/or mechanically fastening the sensor 112 to the storage shelf 104. The signal indicates a baseline angle "a" of the unloaded storage shelf 104. Unloaded, the storage shelf 104 of a storage rack 100 (FIG. 1) rests in a horizontal position. The sensor 112 may be a gyroscope and/or an accelerometer. In aspects, the sensor 112 may be located remote from the warehouse storage rack safety system 110. For example, the sensor 112 may be mounted on the storage shelf 104, and the warehouse storage rack safety system 110 may be located on one of the uprights 102 of the storage rack 100. It is contemplated that the warehouse storage rack safety system 110 may include more than one sensor 112 to monitor more than one storage shelf 104 at a time.

At step 504, the controller 200 receives a second signal from the sensor 112, indicative of a deformation of the storage shelf after an object 105 has been loaded on the storage shelf 104. As an object 105 is placed (e.g., loaded) on the storage shelf 104, the storage shelf will deform under the weight of the object 105 (FIG. 2). This deformation causes the sensor 112 to now be oriented at a different angle (new angle "a'") than when the storage shelf 104 was unloaded.

At step 506, the controller 200 determines an amount of the deformation "h" (FIG. 2) of the storage shelf 104 based on the difference between the baseline angle "a" and the new angle "a'." In aspects, the controller 200 may determine a weight of the object 105 based on the determined deformation "h."

In aspects, when the deformation (and/or weight) exceeds a predetermined threshold value, the controller 200 may generate a warning (visual and/or audio) to alert a user that a weight limit of the storage shelf 104 has been exceeded. The predetermined threshold value may be set prior to installation of the threshold on the storage shelf 104.

In aspects, the controller 200 may send a signal (wired and/or wirelessly) to the Cloud (or other remote device) for further processing. For example, multiple warehouse storage rack safety systems 110 may be monitored at the same time by a central monitoring station.

As can be appreciated, securement of any of the components of the disclosed apparatus can be effectuated using known securement techniques such welding, crimping, gluing, fastening, etc.

Persons skilled in the art will understand that the structures and methods specifically described herein and illustrated in the accompanying figures are non-limiting exemplary aspects, and that the description, disclosure, and figures should be construed merely as exemplary of particular aspects. It is to be understood, therefore, that this disclosure is not limited to the precise aspects described, and that various other changes and modifications may be effectuated by one skilled in the art without departing from the scope or spirit of the disclosure. Additionally, it is envisioned that the elements and features illustrated or described in connection with one exemplary aspect may be combined with the elements and features of another without departing from the scope of this disclosure, and that such modifications and variations are also intended to be included within the scope of this disclosure. Indeed, any combination of any of the disclosed elements and features is within the scope of this disclosure. Accordingly, the subject matter of this disclosure is not to be limited by what has been particularly shown and described.

What is claimed is:

1. A warehouse storage rack safety system, comprising:
   a sensor configured to couple to a shelf and generate a signal indicative of a deformation of the shelf, wherein the sensor includes a gyroscope;
   a processor; and
   a memory, including instructions stored thereon, which when executed by the processor cause the warehouse storage rack safety system to:
   receive the sensed signal; and
   determine an amount of deformation of the shelf based on the signal,
   wherein the amount of deformation is further based on an orientation of the sensor relative to the shelf by:
   determining a first angle of the sensor relative to the shelf before an item is placed on the shelf;
   determining a second angle of the sensor relative to the shelf after the item is placed on the shelf; and
   determining the amount of deformation based on a difference between the first angle and the second angle.

2. The warehouse storage rack safety system of claim 1, wherein the instructions, when executed by the processor, further cause the warehouse storage rack safety to:
   display on a display the determined amount of deformation.

3. The warehouse storage rack safety system of claim 1, wherein the instructions, when executed by the processor, further cause the warehouse storage rack safety system to:
   determine if an object placed on the shelf is overweight by comparing the determined amount of deformation to a predetermined threshold value.

4. The warehouse storage rack safety system of claim 3, wherein the instructions, when executed by the processor, further cause the warehouse storage rack safety system to:
   generate at least one of an audio alert or a visual alert that the object is overweight based on exceeding the predetermined threshold value.

5. The warehouse storage rack safety system of claim 3, wherein the instructions, when executed by the processor, further cause the warehouse storage rack safety system to:
   wirelessly transmit an alert based on the object being overweight to a user device.

6. The warehouse storage rack safety system of claim 5, wherein the instructions, when executed by the processor, further cause the warehouse storage rack safety system to:
   display on the user device the transmitted alert.

7. The warehouse storage rack safety system of claim 3, wherein the instructions, when executed by the processor, further cause the warehouse storage rack safety system to:
   wirelessly transmit an alert based on the object being overweight to the Cloud.

8. The warehouse storage rack safety system of claim 1, wherein the sensor further includes an accelerometer.

9. The warehouse storage rack safety system of claim 1, further comprising:
   a battery configured to power the warehouse storage rack safety system; and
   a low battery monitor configured to generate an alert when the battery has an operating voltage below a second threshold value.

10. A computer-implemented method for a warehouse storage rack safety system, the computer-implemented method comprising:
    receiving a signal from a sensor configured to couple to a shelf and generate the signal indicative of a deformation of the shelf, wherein the sensor includes a gyroscope; and
    determining an amount of deformation of the shelf based on the signal,
    wherein the amount of deformation is further based on an orientation of the sensor relative to the shelf by:
    determining a first angle of the sensor relative to the shelf before an item is placed on the shelf;
    determining a second angle of the sensor relative to the shelf after the item is placed on the shelf; and
    determining the amount of deformation based on a difference between the first angle and the second angle.

11. The computer-implemented method of claim 10, further comprising:
    displaying on a display the determined amount of deformation.

12. The computer-implemented method of claim 10, further comprising:
    determining if an object placed on the shelf is overweight by comparing the determined amount of deformation to a predetermined threshold value.

13. The computer-implemented method of claim 12, further comprising:
    generating at least one of an audio alert or a visual alert that the object is overweight based on exceeding the predetermined threshold value.

14. The computer-implemented method of claim 12, further comprising:

wirelessly transmitting an alert based on the object being overweight to a user device.

15. The computer-implemented method of claim 14, further comprising:
displaying on the user device the transmitted alert.

16. The computer-implemented method of claim 12, further comprising:
wirelessly transmitting an alert based on the object being overweight to the Cloud.

17. The computer-implemented method of claim 10, wherein the sensor further includes an accelerometer.

18. A non-transitory computer-readable medium storing instructions that, when executed by a processor, cause the processor to perform a method for a warehouse storage rack safety system, the method comprising:
receiving a signal from a sensor configured to couple to a shelf and generate the signal indicative of a deformation of the shelf, wherein the sensor includes a gyroscope; and
determining an amount of deformation of the shelf based on the signal,
wherein the amount of deformation is further based on an orientation of the sensor relative to the shelf by:
determining a first angle of the sensor relative to the shelf before an item is placed on the shelf;
determining a second angle of the sensor relative to the shelf after the item is placed on the shelf; and
determining the amount of deformation based on a difference between the first angle and the second angle.

\* \* \* \* \*